United States Patent Office 3,444,137
Patented May 13, 1969

3,444,137
CYANO MODIFIED PHENOLIC RESINS
Harold P. Higginbottom and John R. Le Blanc,
Wilbraham, Mass., assignors to Monsanto Company, St. Louis, Mo., a corporation of Delaware
No Drawing. Continuation-in-part of application Ser. No. 606,580, Jan. 3, 1967. This application Dec. 28, 1967, Ser. No. 694,088
Int. Cl. C08g 5/14, 9/24; C07c 121/50
U.S. Cl. 260—51.5    12 Claims

ABSTRACT OF THE DISCLOSURE

New, modified, curable phenol-aldehyde resins characterized by molecules which contain a cyano group, an amine nitrogen atom, a phenyl group, and a phenyl substituted hydroxyl group, such molecules having been made by reacting a phenol, formaldehyde, and a cyano substituted primary or secondary amine. The cured product resins have improved electrical properties, and improved crosslinkability.

RELATED APPLICATIONS

This application is a continuation-in-part of copending applications, Ser. No. 606,580, filed Jan. 3, 1967, and now abandoned; Ser. No. 610,752 and Ser. No. 610,783, both filed on Jan. 23, 1967, and both now abandoned.

BACKGROUND

Although the prior art has long appreciated that the Michael reaction can be used to prepare primary and secondary amines substituted with at least one electrophilic group by the addition of ammonia or a primary amine to a vinyl compound substituted with at least one electrophilic group, and although the prior art has further appreciated that such a Michael addition product can, itself, be condensed with an aldehyde and a phenol in a Mannich reaction, so far as is known to us, no one has heretofore made phenol-aldehyde resins substituted with cyano groups by either of these reactions or others.

In the art of electrical insulative materials which are in the nature of organic polymers, it has long been appreciated that cyano groups substituted on a polymer chain impart to such polymer improved electrical properties (especially insulative properties), and, frequently, improved versatility (owing to the capacity of the cyano group to undergo further reactions under controlled conditions).

In the art of phenolic resins, it has long been desired to modify the structure of such resins so as to chemically incorporate thereinto cyano groups without adversely affecting product resin properties. So far as is known, however, no one has heretofore succeeded in producing phenol-aldehyde resins having chemically incorporated into their structure cyano groups.

By the present invention, there are provided phenol-aldehyde resins which have chemically incorporated into their structure cyano groups and which characteristically have when cured improved electrical properties (especially insulative properties), improved crosslinkability and improved strength properties. These improved, modified phenol-aldehyde resins are made using an adaptation of the Mannich reaction, and, preferably, by also using, in a preliminary step, the Michael reaction.

SUMMARY

This invention relates to curable modified phenol-aldehyde resins which are characterized by having number average molecular weights of at least about 125 and which typically (though not necessarily) range from about 175 to 800. These resins are further characterized by containing molecules each of which has a chemical structure containing:

(a) At least one cyano group,
(b) At least one tri-organo-substituted amine nitrogen atom, and
(c) At least one phenyl group, said phenyl group being further characterized by having substituted thereon:
(1) At least one hydroxy group,
(2) At least two di-organo-substituted carbon atoms, in positions ortho and para of said hydroxyl group, and
(3) One of said carbon atoms being bonded to said one (additionally) amine nitrogen atom.

As used herein, the term "organo substituted" has reference to the fact that a designated atom (e.g., carbon or nitrogen) is substituted by a group which contains carbon atom(s) and not merely hydrogen only. Such modified phenol-aldehyde resins are made by heating substantially under base catalyzed liquid phase conditions a reaction mixture comprising formaldehyde, at least one amine of the formula:

(1)
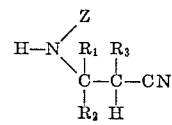

where Z is selected from the group consisting of hydrogen, lower alkyl, aryl (6–10), alkaryl (7–15), aralkyl (7–15), lower haloalkyl, haloaryl (6–10), haloalkaryl (7–15), haloaralkyl (7–15), hydroxy-(lower alkylene), cyano-(lower alkylene), $H_2N$-(lower alkylene), lower alkyl —N— (lower alkylene), di (lower alkyl) —N— (lower alkylene), $H_2N$-(ethylene —NH— ethylene), lower (alkoxy-alkylene), C-substituted 5 and 6 membered heterocyclic rings containing one nitrogen atom and C-substituted 5 and 6 membered heterocyclic rings containing one oxygen atom, $R_1$ is selected from the group consisting of hydrogen, and lower alkyl, $R_2$ and $R_3$ are each selected from the group consisting of hydrogen, lower alkyl, aryl (6–10), cyano (lower alkylene), alkaryl (7–15), aralkyl (7–15), haloaryl (6–10), haloalkaryl (7–15), haloaralkyl (7–15), hydroxy (lower alkylene), phenyl, lower (alkoxyalkylene), and at least one phenolic material selected from the group consisting of (a) phenol-aldehyde novolac resins, (b) phenol-aldehyde resole resins, and (c) phenols of the formula:

(2)
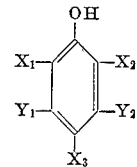

where $X_1$, $X_2$ and $X_3$ are each selected from the group consisting of hydrogen, lower alkyl, aryl (6–10), hydroxyl, halo (provided that at least 2 of $X_1$, $X_2$ and $X_3$ are hydrogen in any given molecule), and $Y_1$ and $Y_2$ are each selected from the group consisting of hydrogen, lower alkyl, aryl (6–10), hydroxyl, and halo.

As used herein, the term "lower" has reference to less than 10 carbon atoms. In general, the compounds of, respectively, Formulas 1 and 2 (above) are known to the prior art and therefore do not form part of the present invention. In the definitions of terms in formulas given herein each of the number range in parentheses given following a term indicate the numbers of carbon atoms which may be present in the radical designated by such term. The term "halo" includes fluorine, chlorine and bromine. A preferred halo is chlorine.

In this reaction mixture, there is present initially a mol ratio of said aldehyde to said phenolic material of from about .5 to 3.5 (preferably from about 0.8 to 3.0), and a mol ratio of said amine to said phenolic material of from about .01 to 3.0 (preferably from about .1 to 1.0).

Typical reaction temperatures range from about 25° C. up to reflux temperatures (e.g. 100±10° C.). Preferred temperatures range from about 40 to 70° C.

The mol ratio of the amine of Formula 1 to the phenol of Formula 2 can range very broadly since even minute amounts of amine react with phenol (in the presence of said aldehyde) to produce products within the teachings of this invention and since (as those skilled in the art will appreciate) up to 3 or even more moles of said amine can react with said phenol (assuming sufficient of said aldehyde is present) to produce products within the teachings of this invention. However, typical illustrative mol ratios of said amine to said phenol range from about .01 to 3.0 and preferably from about .1 to 1.0.

Similarly, the mol ratio of the formaldehyde to the phenol of Formula 2 can range very widely, the amount used in any given instance being dependent not only on the type of product to be produced (e.g. resole resin or novolac resin), but also on the quantity of amine of Formula 1 which is to be reacted with phenol of Formula 2, to produce products within the teachings of this invention. However, typical illustrative mol ratios of said aldehyde to said phenol range from about 0.5 to 3.5, and preferably from about 0.6 to 3.0.

The amount of liquid used is not critical. It is preferred but not necessary to have reactants dissolved in the liquid of the reaction medium at the time of the reaction. Water is a preferred liquid but inert (as respects reactants and reaction products) organic liquid can be used. Preferred organic liquids are liquid alkanes and alkanols.

The reaction is catalyzed by materials which have an alkaline pH (i.e. greater than 7) in water (preferably a pH of from 7.5 to 9.0). Any convenient alkaline material may be dissolved in the reaction medium to produce this alkalinity. Suitable alkaline catalysts include hexamethylenetetramine, ammonium hydroxide, triethylamine, quaternary ammonium hydroxides, sodium hydroxide or mixtures thereof, and the like.

It will be appreciated that certain of the reactants of Formula 1 themselves catalyze the reaction. These amines can in some cases catalyze reaction without the need of added catalyst.

When preparing products of this invention under aqueous conditions, it is preferred to use a pH greater than 7. However pH values less than 7 can be employed; for example, we can employ the hydrochloride salts of amines of Formula 1 as starting materials which tend to produce a pH less than 7. In general, it is preferred to employ inorganic alkaline materials as alkaline catalysts in practicing this invention. Typical quantities are generally less than about 0.1 mol (based on total weight of amine of Formula 1). Production of certain classes of products of this invention are favorably influenced by the presence of alkaline catalyst. Thus, resole production is favored by alkaline catalysis.

Reaction times typically range from about ½ to 10 hours depending upon such variables as temperature, alkalinity reactants, dilution, and the like. In general, it is preferred to so control such variables that the reaction times range from about 1 to 3 hours. In general, a reaction is continued until the desired degree of reaction is achieved between amine of Formula 1, formaldehyde and phenol of Formula 2, or at least until a product of the invention is formed (having the above described characteristics). The extent of the reaction is generally conveniently followed by measuring aldehyde content of the reaction mixture.

Although the compounds of Formulas 1 and 2 are generally known to the prior art, and so do not form part of the present invention, it is convenient and preferred to sometimes form an amine of Formula 1 as a preliminary synthesis step even using the same vessel or kettle as that in which a product of the invention is to be subsequently formed as a matter of convenience and economy. Thus, one can first react at least one vinyl compound of the formula:

(3)

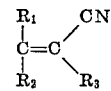

where $R_1$, $R_2$ and $R_3$ are as defined above, with at least one nitrogen containing material of the formula:

(4)          $H_2N—Z$ where Z is as defined above, under aqueous alkaline liquid phase conditions. Typically, there is at least initially present in said reaction mixture a mol ratio of said vinyl compound to said nitrogen containing material of from about 2.2:1 to 0.8:1. The optimum ratio for a given reaction depending upon the number of replaceable hydrogen atoms in the Formula 4 material, other things being constant.

Then, in the subsequent reaction between thus formed amine of Formula 1, formaldehyde, and phenol of Formula 2, the same alkaline reaction medium can be employed. The generation of the amine of Formula 1 and the production of a product of the invention can be accomplished as a single step in the same vessel using the same conditions. Using such a synthesis technique, the mol ratio of formaldehyde to phenol of Formula 2 is conveniently, though not necessarily, from about 1:1 to 4:1.

Even the nitrogen containing material can be generated in situ. Thus for example, one can use an ammonia releasing agent such as ammonium hydroxide, or the like.

Examples of suitable nitrogen containing materials include ammonia, ammonium hydroxide, methylamine, ethylamine, ethanolamine n-propylamine, isopropylamine, n-butyl amine, amylamine, cyclohexylamine, benzylamine, and the like; methylene dianiline, the ethylene amines, meta-phenylene diamines, versamides (a commercial trade name for polyamides having residual amine groups), and the like. Ammonia is preferred.

Examples of suitable amines of Formula 1 include di-(β-cyanoethyl) amine, 3-methylaminopropionitrile, 3-ethylaminopropionitrile, 3-(3-hydroxyethylamino) propionitrile, 3-isopropylaminopropionitrile, 3,3' - (ethylene diimino)dipropionitrile, 3 - pentylaminopropionitrile, 3-cyclohexylaminopropionitrile, 3-benzylaminopropionitrile and the like; 3-anilinopropionitrile, 3,3'-(m-phenylenediimino)dipropionitrile, and the like.

Examples of suitable phenols of Formula 2 include phenols such as cresol, xylenol, t-butyl phenol, octyl phenol, chlorophenols, 3-chloro-4-methyl phenol, and the like. Phenol is presently preferred.

Examples of vinyl compounds of Formula 3 include acrylonitrile, methacrylonitrile, β-methylacrylonitrile, α-chloromethylacrylonitrile, α-hydroxymethylacrylonitrile, 1,4-dicyanobutene-1, 2,4-pentadienenitrile, α-methoxycrotonitrile, α-cyanostyrene, β-cyanostyrene and the like. Acrylonitrile is preferred.

As indicated above, a previously prepared phenol-aldehyde resole resin can be used as a starting material in making a product of this invention. For purposes of this invention, such a resin can be considered to be a solvent soluble reaction product between a phenol (for example, a phenol of Formula 2) and an aldehyde condensable therewith under liquid phase base catalyzed conditions. Preferred resoles are those formed by the condensation of phenol with formaldehyde. Liquid resins, varnish resins, so-called one-stage solid resins, and the like, are suitable resoles for use as starting materials in this invention.

Similarly, as indicated above, a previously prepared phenol-aldehyde novolac resin can be used as a starting material to prepare a product of this invention. For purposes of this invention, such a resin can be considered to be any solvent soluble reaction product between a phenol (for example, a phenol of Formula 2) and an aldehyde condensable therewith under liquid phase acid catalyzed conditions. Preferred novolacs are those formed by the condensation of phenol with formaldehyde. Any novolac which contains unreacted ortho or para ring positions is suitable for use as a starting material for use in this invention.

It will be appreciated that the products of this invention are typically, and even characteristically, in the form of complex mixtures of various products of which the actual products of the present invention may form but a minor portion, depending upon synthesis conditions and reactants. In general, products of the invention are either in a low molecular weight form (monomers, dimers, trimers, and the like), as when a phenol or a resole resin is used in the starting reaction mixture, or in a higher molecular weight form (polymeric), as when a novolac resin is used in the starting reaction mixture. To some extent, of course, as those skilled in the art will readily appreciate, the molecular weight of a product of the invention is dependent upon reaction time (other things being equal). The longer the reaction time, the higher the product molecular weight.

In general, the products of this invention are complex mixtures containing molecules characterized as described above. By carefully controlling selection of reactants and reaction conditions, however, production of certain products is favored over other products.

One class of preferred products of the present invention are: Resole resins which structurally are benzylamines characterized by having the following generic formula:

(5)

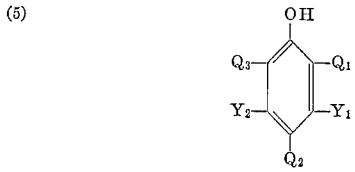

where $Y_1$ and $Y_2$ are as defined above, and $Q_1$, $Q_2$ and $Q_3$ are each selected from the group consisting of hydrogen, the radical —$CH_2OH$ and the radical:

(6)

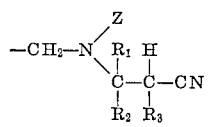

provided that at least one of $Q_1$, $Q_2$ and $Q_3$ is the radical —$CH_2OH$, and, further, that at least another of $Q_1$, $Q_2$ and $Q_3$ is the radical of Formula 6, $R_1$, $R_2$ and $R_3$ are as defined above, and Z is as defined above.

The products of Formula 5 can be termed: N-cyano (lower alkylene) -2 (and/or 4)-hydroxyl-4 (and/or 2)-methylol benzylamines.

Products containing a high percentage of Formula 5 material can be made conveniently though not necessarily, by following any one of three procedures. By one procedure, one reacts an amine of Formula 1 simultaneously with formaldehyde and a phenol of Formula 2 under base catalyzed liquid phase conditions.

By a second procedure, a phenol of Formula 2 is pre-reacted with formaldehyde under liquid base catalyzed conditions. Then, in a second step of this second route, an amine of Formula 1 is added and the reaction is continued. Addition of formaldehyde may be necessary to continue this second step if insufficient formaldehyde is present at the time of amine addition. The ratio of amine to formaldehyde is preferably as described above.

By the third route, an independently and previously prepared resole (such as one commercially available) is used as a starting material. Typically, such a resole is in a liquid form (either aqueous or non-aqueous).

To this resole is added an amine of Formula 1 together with sufficient formaldehyde to provide the indicated mol ratio of formaldehyde to amine as indicated above. There is also desirably present in this initial starting mixture a suitable base catalyst although this is not always required since the amine of Formula 1 will typically autocatalyze the reaction. Addition of inorganic base is preferred. This initial starting mixture is then heated to form a product of the invention.

Those skilled in the art will appreciate that, in preparing benzylamine (resole) products of this invention, the maximum percentage of (monomeric) benzylamine present in any given product mixture is determined by the reaction conditions (e.g., temperature, time, catalyst, etc.) employed. For example, other things being equal, the longer the reaction time, the more chance there is for polymeric product forms to develop owing to the fact that methylene bridges between adjoining phenyl nuclei form.

One class of Formula 5 benzylamines are produced when one employs an amine of Formula 1 where Z is equal to hydrogen.

In this class of materials, there is a linking group between two phenyl nuclei attached at either end to respective positions either ortho or para of the terminal hydroxyl group substituted phenyl nucleus. The other position either ortho or para of the hydroxyl group on each phenyl nucleus is usually substituted with a methylol (—$CH_2OH$) group. This class of benzylamine products is represented conveniently by the following formula:

(7)

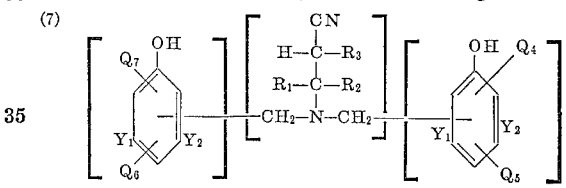

where $Q_4$, $Q_5$, $Q_6$ and $Q_7$ are each independently selected from the group consisting of hydrogen, —$CH_2OH$, and the radical of Formula 6, and $R_1$, $R_2$ and $R_3$ are defined as above, and Z, $Y_1$ and $Y_2$ are as defined above.

Compounds of Formula 7 are conveniently made by following any one of the just given three preparative procedures.

Another class of benzylamine products of Formula 6 are represented conveniently by the following formula:

(8)

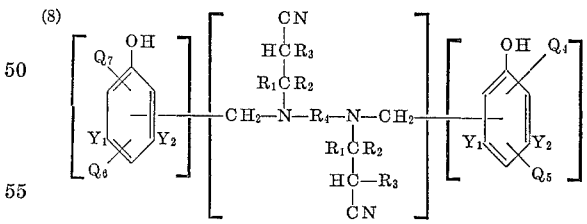

where $Q_4$, $Q_5$, $Q_6$ and $Q_7$ are as defined above in reference to Formula 7, and $R_1$, $R_2$ and $R_3$ each have their above defined meanings. Typically, all Q's are either ortho or para relative to a phenyl hydroxyl group. $Y_1$ and $Y_2$ are as defined above.

Formula 8 benzylamines are prepared by using an amine of Formula 1 wherein Z can be the radical (9)

where $R_4$ is lower alkylene, lower alkylene

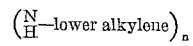

and $n$ is a number of from 1 through 12 or even more, although $n$ preferably and conveniently ranges from 1 through 5.

Such amines of Formula 1 containing the radical of Formula 9 are conveniently prepared by reacting a vinyl compound of Formula 3 with an amine of Formula 4 wherein Z is a radical of Formula 9, as those skilled in the art will readily appreciate.

Another class of preferred products of this invention are novolac resins which characteristically are polymeric materials in which each independent polymer molecule may be conveniently represented by the formula:

(10)

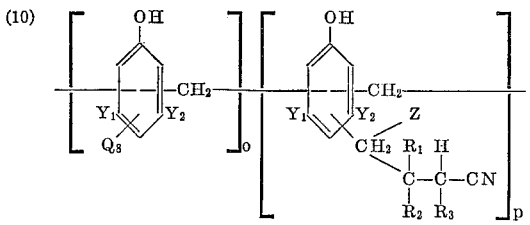

where $Q_8$ is hydrogen or a radial as defined in Formula 6 above, and Z, $R_1$, $R_2$ and $R_3$ are as defined above, and $o$ and $p$ are each a number greater than 0, and the sum of $o$ and $p$ is always (on a number average basis) at least two and typically less than about 15. $Y_1$ and $Y_2$ are as defined above.

A preferred procedure for making the products of Formula 10 involves the condensation of a phenol of Formula 2 and formaldehyde under acidic aqueous conditions to form a uniform dispersion of novolac in water. This dispersion is then mixed with an amine of Formula 1 and additional formaldehyde is added to bring the mol ratio of formaldehyde and amine into the range above indicated. These reactants are conveniently reacted below about 80° C. and thereafter the excess water is removed by heating above 100° C. with the application of vacuum. After such dehydration, the product can be handled either as a solid (upon cooling) or as a varnish (by the addition of non-reactive solvents such as alcohols or ketones). Such a solid product is brittle and can be handled and compounded similarly to conventional phenolic novolacs using the conventional methods well known to the art.

Preformed novolacs can also be dissolved in a non-reactive solvent and then mixed with both an amine of Formula 1 and formaldehyde. This mixture is then reacted in accordance with the process teachings of this invention to produce a product of the invention. After reaction, the solvents (including water) can be removed by heating above 100° C. with the application of vacuum, and the product formulated and used as just described above.

The products of Formula 10 can be termed: N-cyano (lower alkylene) amino methylated phenol-formaldehyde novolacs.

A class of preferred novolac resins of this invention are made by reacting a primary amine of Formula 1 (i.e. one wherein Z is H) with phenol and formaldehyde. The resulting novolac resins so produced from such a combination of starting materials tend to have a nitrogen atom in the linking group between adjacent phenyl nuclei. Such product novolacs may be conveniently represented by the following formula:

(11)

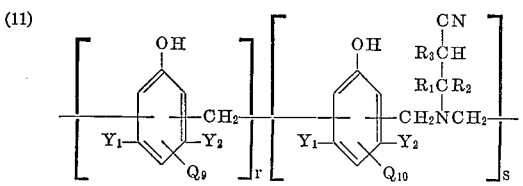

wherein $Q_9$ and $Q_{10}$ are each selected from the group consisting of hydrogen, —$CH_2$— and a radical of Formula 6, and $r$ and $s$ are each a number greater than 0, and the sum of $r$ and $s$ is always (on a number average basis) at least 2, and typically is less than about 20. $Y_1$ and $Y_2$ are as defined above.

The presence of the linking group —$CH_2$N—$CH_2$— is controlled by the concentration of amines of Formula 1 where Z is equal to H used in the starting materials.

A class of resins of this invention are conveniently characterized by the following general formula:

(12)

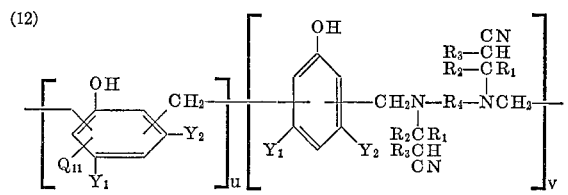

where $Q_{11}$ and $Q_{12}$ are each hydrogen, or a radical of the structure shown in Formula 9, and $R_1$, $R_2$, $R_3$ and $R_4$ are as defined above, and $Y_1$ and $Y_2$ are as defined above, and $u$ and $v$ are each a number greater than 0, and the sum of $u$ and $v$ is always (on a number average basis) at least 2, and typically, is less than about 20.

The resins of Formula 12 are made by using a polyamine as the Formula 1 amine in following the preparative procedures described herein.

Resole and novolac products can be prepared as concentrates containing relatively high weight percentages of the novel products of this invention, and then such concentrates can be diluted or admixed with various other resins, for example, of the conventional resole and novolac type. In general, the products of this invention are used in combination with other conventional phenolic resin materials particularly since such materials are inherently present in combination with products of the invention owing to the methods of making. Products of the invention, however, are always characterized, as above described, by the presence of characteristic chemical structures. The presence of these structures may be detected by the usual analytical tools, including nuclear magnetic resonance, infra-red, ultra-violet, mass spectrometry, gas phase and liquid phase chromatography, and the like.

As those skilled in the art will appreciate, the purification of any given product of this invention into a pure form is typically a difficult and time consuming procedure owing to the fact that such a pure product must be separated from among a complex mixture of co-reaction products. Conventional purification procedures, however, are employed to produce purified products of this invention, including paper chromatographic separation techniques. Even purified products of this invention, however, characteristically cure to solid, stable forms in the ways heretofore known to the phenolic resin art for curing, respectively, resole phenolic resins and novolac phenolic resins to produce useful products which can be used generally in ways heretofore known to the phenolic resin art, e.g. molding powders, varnishes, impregnants, adhesives, and the like.

The utilities associated with the products of this invention do not depend upon the usage of such products in a pure form. It has been observed, for example, that improved electrical insulative properties are obtained from cured resole resins containing a resole product of this invention by having as low as 1 starting resole molecule in 10 or even lower a resole product of the invention, or from cured novolac resins containing a novolac product of this invention by having as low as 1 radical of the type shown in Formula 6 or in Formula 9 per 10 phenol moieties (i.e. phenyl groups each having at least one hydroxyl group attached) in an (uncured) novolac material, or even lower.

As those skilled in the art will appreciate, it is sometimes desirable to employ mixtures of amines of Formula 1 and/or of phenols of Formula 2 in preparing products of this invention, particularly when it is desired to produce a resinous product having a broad spectrum of use properties.

The products of this invention can be partially or completely dehydrated depending on the application in which they are to be employed. Organic solvents can be added to the product resins when varnishes are desired. Applicable organic solvents which can be used alone or in admixtures are methanol, ethanol, methyl ethyl ketone, and the like. The varnishes can be used to impregnate fiber sheets such as cellulose paper, asbestos paper, cotton fabric, electrical grade cellulose paper, and the like.

The resole-phenol resin products of this invention find utility in a number of applications such as corestock for decorative laminates, cork binding, cloth laminates, wire coating, surface coatings, adhesives, friction elements, coating abrasives, molding compounds, granuplasts, and the like. The resins of this invention can be used with conventional additives such as fillers, plasticizers, stabilizers, flame-retardants, and the like.

The novolacs of this invention are typically formed using from 0.5 to 0.9 mol of formaldehyde per mol of phenol of Formula 2. However, additional formaldehyde is employed during the co-condensation of said pre-reaction product and the novolac.

The novolac phenolic resins of this invention can be partially or completely dehydrated depending on the application in which they are to be employed. The resins thus made are brittle materials which may be easily crushed and then compounded with conventional additives such as fillers, pigments, asbestos fillers, plasticizers, stabilizers, flame-retardants, and the like.

The modified novolac phenol resins of this invention find utility in a number of applications such as friction elements, coating abrasives, molding compounds, granuplasts, binding agents for insulation, grinding wheels, mica, cork, and the like.

The modified novolac resins of this invention find particular utility as molding powders and possess the advantage of being self-curing with negligible evolution of volatiles which is not a characteristic of conventional novolac-type phenolic molding powders.

The self-curing mechanism is essentially independent of the normal curing mechanism the art associates with phenolic resins. This self-cure is time and temperature dependent and involves the reaction of the cyano groups with themselves to give stable conjugated structures, e.g. triazine ring systems and intermediates. Temperatures of 150° C. or above are usually needed to accelerate such self-cure or secondary cure. The secondary cure reaction proceeds at a slower rate than the normal phenolic cure. It is sometimes desirable and highly advantageous to combine a normal phenolic cure with a secondary cure when curing a product of this invention. For example, the modified novolacs described herein can be cured with hexemethylenetetramine in molding compositions in order to rapidly obtain initial strength and integrity of the molded piece. This molded piece can then be post cured to develop additional secondary cure which results in a molded item with excellent electrical and strength properties.

The novolacs of this invention cure into clear compact masses free of bubbles, voids and cracks which are generally present in cured conventional phenolic resins because of volatile evolution and entrapment of the volatiles within the resin mass. However, the conventional curing agents for molding powder phenolic resins such as aldehydes or a compound which releases an aldehyde at molding temperatures may be employed with the novel resins of this invention in quantities of from about 1 to 15 parts thereof per 100 parts of resin of this invention. Volatile aldehydes like formaldehyde, or as a solid reaction product, such as hexamethylenetetramine, hexamethylol melamine, or the like. The resins of this invention also possess electrical properties as demonstrated in the following examples which are not characteristic of conventional phenolic resins.

Another advantage and improvement in the modified resins of this invention is that various active hydrogen compounds, i.e. primary and secondary amines, will co-react with the modified novolacs of this invention, and thus can be used as crosslinking agents therefor. Such materials are not reactive with conventional novolacs. Examples of suitable active hydrogen containing compounds are methylene dianiline, the ethylene diamines, metal-phenylene diamines, versamides (a commercial trade name for polyamides having residual amine groups), and the like. These materials may be effectively employed in quantities of from about 5 to 20 parts thereof per 100 parts of a novel resin of this invention.

EMBODIMENTS

The following examples are set forth to illustrate more clearly the principles and practices of this invention to one skilled in the art and they are not intended to be restrictive but merely to be illustrative of the invention herein contained. Unless otherwise stated herein, all parts and percentages are on a weight basis.

As indicated earlier, it is convenient to prepare amines of Formula 1 in the same reactor as that in which products of the invention are prepared. Exemplary amines and methods for their preparation are given in Table 1 below.

Example 1

Part A.—Charge 1000 parts of 28 percent ammonium hydroxide to a suitable reaction vessel and adjust the temperature to 30° C. Add 1660 parts of acrylonitrile at a rate such that the temperature of the exothermic reaction does not exceed 35° C. After the acrylonitrile is added, maintain the reaction temperature at 30 to 35° C. with cooling as needed for 2 hours. Vacuum strip the reaction product to 100° C. under 28" mercury pressure. The reaction product has a formaldehyde reactivity (equivalent to number of replaceable amine hydrogens) of 0.77 mole per 100 grams.

Part B.—Charge 150 parts of phenol and 9.0 parts of 50 percent aqueous NaOH to 104 parts of the product of Part A at 45° C. and atmospheric pressure. Slowly add 192 parts of 50 percent formalin (50/50 formaldehyde-water) with cooling as needed to keep the temperature between 45° to 50° C. After the formalin has been added and the exothermic reaction subsided, heat the mixture to a reflux under vacuum at 65° C. and continue refluxing the mixture until the free formaldehyde is below 1 percent. The mass is cooled. The product is a resole resin. This product is then dehydrated to produce a product resin having 70–75 percent solids.

Part C.—Part B of Example 1 is repeated except that 0.8 mole equivalents (based on reactive amine hydrogen) of each amine of Table 1 is used in place of product of Part A to produce a total of seven different resole products which are each partially dehydrated as in Part B (above).

Each of the phenolic resins of this example has a molecular weight in excess of about 150, and each product contains molecules which are characterized by containing:
 (a) At least one cyano group,
 (b) At least one amine nitrogen atom, and
 (c) At least one phenyl group. This phenyl group is further characterized by having substituted thereon:

(1) at least one hydroxyl group,
(2) at least two tri-substituted carbon atoms in positions ortho and para of said hydroxyl groups, and
(3) one of said carbon atoms being bonded to said one amine nitrogen atom.

Example 2

Part A.—Part A of Example 1 is repeated.
Part B.—Charge 150 parts of phenol and 192 parts of 50 percent formalin to a suitable reaction vessel. Add 9 parts of 50 percent aqueous NaOH. Heat the mixture to a reflux under vacuum at 65° C. and continue refluxing until the mixture contains 17 percent free formaldehyde. Then add 104 parts of the reaction product of Step A over a period of 15 minutes and continue refluxing the mixture under vacuum until the free formaldehyde con-

11 tent is below 1 percent. Then dehydrate the resin to 70 to 75 percent solids and cool the product. The product is a resole resin.

Part C.—Part B of Example 1 is repeated except that 0.8 mole equivalents (based on reactive amine hydrogen) of each amine of Table 1 is used in place of product of Part A to produce a total of seven different resole products which are each partially dehydrated as in Part B (above).

Each of the phenolic resins of this example has a molecular weight in excess of about 150, and each product contains molecules which are characterized by containing:

(a) At least one cyano group,
(b) At least one amine nitrogen atom, and
(c) At least one phenyl group. This phenyl group is further characterized by having substituted thereon:

(1) at least one hydroxyl group,
(2) at least two tri-substituted carbon atoms in positions ortho and para of said hydroxyl groups, and
(3) one of said carbon atoms being bonded to said one amine nitrogen atom.

Example 3

Part A.—Part A of Example 1 is repeated.

Part B.—Charge 100 parts of a preformed and salt free resole-type liquid resin at 65 percent resin solids and containing 1.4 moles of combined formaldehyde per mol of phenol to a suitable reaction vessel. Add 21 parts of 50 percent formalin. Heat the mixture to 45° C. and add 44 parts of the reaction product of Step A dropwise to the mixture while maintaining the temperature of the mixture below 50° C. After the 44 parts of the reaction product of Step A has been added, hold the mixture at 50° C. for ½ hour. Then cool the product. The product is a resole resin.

Part C.—Part B of Example 3 is repeated except that 0.8 mole equivalents (based on reactive amine hydrogen) of each amine of Table 1 is used in place of product of Part A to produce a total of seven different resole products which are each partially dehydrated as in Part B (above).

Each of the phenolic resins of this example has a molecular weight in excess of about 150, and each product contains molecules which are characterized by containing:

(a) At leasst one cyano group,
(b) At least one amine nitrogen atom, and
(c) At least one phenyl group. This phenyl group is further characterized by having substituted thereon:

(1) at least one hydroxyl group,
(2) at least two tri-substituted carbon atoms in positions ortho and para of said hydroxyl groups, and
(3) one of said carbon atoms being bonded to said one amine nitrogen atom.

Example 4

Part A.—Part A of Example 1 is repeated.

Part B (Step A).—Charge 500 grams of phenol to a suitable reaction vessel and heat the phenol to 95° C. Add one gram of 98 percent sulphuric acid. Then slowly add 217 grams of 50 percent formalin (50/50 formalin-water) to the acidified phenol over a period of 15 to 20 minutes. Maintain the reaction mixture at 100° C., reflux for one hour and then cool the reaction mixture to an end temperature of 80° C. The product is a novolac dispersion resin.

Step B.—Slowly add 129 grams of the product of Part A to the mixture of Step A with mixing to form a homogeneous solution and then cool the solution to 65° C. Slowly add 64 grams of 50 percent formalin to the solution with cooling as needed to keep the temperature below 66° C. Maintain the mixture at 65 to 70° C. for one hour and then dehydrate the mixture to an end temperature of 125° C. at 28″ of mercury. The cooled product is a novolac resin.

Part C (Step A).—Step A of Part B is repeated.

Step B.—Slowly add 1.0 mol equivalents (based on re-

12 active amine hydrogen) of the secondary amine product, number B, from Table 1 to the mixture prepared in Step A above with mixing to form a homogeneous solution. This product mixture is then cooled to 65° C. Slowly add 64 grams of 50 percent formalin to the solution with cooling as needed to keep the temperature below 66° C. Maintain the mixture at 65–70° C. for one hour and then dehydrate the mixture to an end temperature of 125° C. at 28″ of mercury.

This procedure is repeated except that for the indicated secondary amine product, each of the secondary amine products C, E, and F of Table 1 is used so that in all 4 different novolac resin products are made.

Part D (Step A).—Charge 500 grams of phenol to a suitable reaction vessel and heat the phenol to 95° C. Add 1 gram of 98 percent sulphuric acid. Then slowly add 187 grams of 50 percent formalin (50/50 formaldehyde-water) to the acidified phenol over a period of 15 to 20 minutes. Maintain the reaction mixture at 100° C., reflux for 1 hour and then cool the reaction mixture to an end temperature of 80° C.

Step B.—Slowly add 84 grams of 3,3′-(ethylene diimino) dipropionitrile (amine product D, Table 1) to the mixture of Step A with mixing to form a homogeneous solution and then cool the solution to 65° C. Slowly add 60 parts of 50 percent formalin to the solution with cooling as needed to keep the temperature below 66° C. Maintain the mixture at 65 to 70° C. for one hour and then dehydrate the mixute to an end temperature of 105° C. at 28″ of mercury vacuum. A novolac-type resin product is obtained.

Part E Step A.—Step A of Part D is repeated.

Step B.—Slowly add 42 grams of 2-methyl-3-aminopropionitrile (amine product G, Table 1) to the mixture of Step A with mixing to form a homogeneous solution and then cool the solution to 65° C. Slowly add 60 grams of 50 percent formalin to the solution with cooling as needed to keep the temperature below 66° C. Maintain the mixture at 65 to 70° C. for one hour and then dehydrate the mixture to an end temperature of 105° C. at 28″ mercury vacuum. A novolac type resin product is obtained.

Part F (Step A).—Step A of Part B of Example 4 is repeated except that 5.32 moles of each of the substituted phenols shown as Examples 43 and 45 in Table 4 are used in place of phenol to produce two different novolac intermediates at 80° C.

Step B.—Slowly add 129 grams of the product of Part A to each of the products produced by Step A of this Part D. Each of the resulting mixtures is then cooled to 65° C. Slowly add 64 grams of 50 percent formalin to each mixture with cooling as needed to keep the temperature below 66° C. Maintain each mixture at 65 to 70° C. for one hour and then dehydrate each mixture to an end temperature of 125° C. at 28″ of mercury. Two different novolac products are produced.

Part G (Step A).—Charge 5.32 moles resorcinol and 200 grams water to a suitable reaction vessel and heat the mixture to 95° C. Add one gram of 98 percent sulphuric acid. Then slowly add 217 grams of 50 percent formalin (50/50 formalin-water) to the acidified phenol over a period of 15 to 20 minutes. Maintain the reaction mixture at 100° C., a reflux for one hour and then remove 200 grams of water under vacuum. Cool the reaction mixture to an end temperature of 80° C. The product is a dispersion of novolac-type resin.

Step B.—Slowly add 129 grams of the product of Part A to the mixture of Step A with mixing to form a homogeneous solution and then cool the solution to 65° C. Slowly add 60 grams of 50 percent formalin to the solution with cooling as needed to keep the temperature below 66° C. Maintain the mixture at 65 to 70° C. for one hour and then dehydrate the mixture to an end temperature of 105° C. at 28″ of Hg vacuum. The product upon cooling is a solid novolac type resin.

Part H (Step A).—Charge 2.66 moles of phenol and 2.66 moles of para-nonylphenol to a suitable reaction vessel and heat the mixture to 95° C. Add one gram of 98 percent sulphuric acid. Then slowly add 217 grams of 50 percent formalin (50/50 formalin-water) to the acidified phenol over a period of 15 to 20 minutes. Maintain the reaction mixture at 100° C., reflux for one hour and then cool the reaction mixture to an end temperature of 80° C. The product is a dispersion of novolac resin.

Step B.—Slowly add 129 grams of the product of Part A to the mixture of Step A with mixing to form a homogeneous solution and then cool the solution to 65° C. Slowly add 64 grams of 50 percent formalin to the solution with cooling as needed to keep the temperature below 66° C. Maintain the mixture at 56 to 70° C. for one hour and then dehydrate the mixture to an end temperature of 125° C. at 28″ of Hg vacuum. The product upon cooling is a solid novolac type resin.

Example 5

Part A.—Part A of Example 1 is repeated.
Part B.—Part B of Example 4 is repeated except that in Step B, 258 grams in place of the 129 grams of the product of Part A is added to the dehydrated mixture of Step A and 128 grams in place of the 64 grams of 50 percent formalin is added to the solution.

Example 6

Part A.—Part A of Example 1 is repeated.
Part B (Step A).—Step A of Example 4 is repeated.
Step B.—Step B of Example 4 is repeated except that 516 grams in place of the 129 grams of the product of Part A is added to the dehydrated mixture of Step A and 244 grams in place of the 64 grams of 50 percent formalin is added to the solution and the formalin is added slowly over a period of ½ hour and the mixture is then maintained at 65° C. for 3 hours.

Example 7

Separate 10 gram samples of the modified novolacs of Examples 4 (Part B), 5 and 6 are placed in aluminum dishes. The resins are melted and devolatilized at 140° C. and 28″ mercury, then the resins are cured at 150° C. for 24 hours without the formation of bubbles, voids or cracks. Various electrical properties of the three cured resins are tested. The results of such tests and published data for similar tests of unmodified novolac type phenolics are given in Table A.

provement in arc resistance of phenolic resins obtains by this invention because conventional phenolic resins have negligible arc resistance.

Example 8

Charge 1.6 moles of each starting phenol of Formula 2 as specified in Examples 42, 44, 45, 47, 48 and 49 of Table 4 and 5 grams of triethylamine to 104 grams of the product of Part A at 45° C. and atmospheric pressure. Slowly add 192 grams of 50 percent formalin (50/50 formaldehyde-water) with cooling as needed for each to keep temperature between 45° to 50° C. After the formalin has been added to each mixture and the exothermic reaction subsided, heat each mixture to a reflux under vacuum at 65° C. and continue refluxing each mixture until the free formaldehyde is below 1 percent. Each mass is cooled and dehydrated until the water content is below 10 percent. Acetone solvent is then added to each mixture to produce a total of 6 different resole varnish resins each having 60–65 percent solids.

Example 9

Part E.—Charge 124 parts of saligenin slurried with 100 parts of water to 123 parts of purified 3,3′-iminopropionitrile at 45° C. and atmospheric pressure. Slowly add 60 parts of 50 percent formalin (50/50 formaldehyde-water) with cooling as needed to keep the temperature at 45° C. After the formalin has been added and the exothermic reaction subsided, hold the mixture at 45° C. for 1 hour. Dehydrate the mass to below 5 percent water content. The product is a resole resin.

Examples 10–25

Referring to Table 2, each of the indicated amines of Formula 1 is individually reacted with phenol, each in the respective mol quantity specified, using the indicated procedure of a designated preceding example. The product resole phenolic resin in each instance has characteristics generally like those specified for the products of Example 1.

Examples 26–41

Referring to Table 3, each of the indicated amines of Formula 1 is individually reacted with each of the indicated phenols of Formula 2, each in the respective mol quantity specified, using the indicated procedure of a designated preceding example. The product novolac phenolic resin in each instance has characteristics generally like those specified for the products of Example 4.

TABLE A

| Properties | ASTM Test Method | Example 4 (Part B) | Example 5 | Example 6 | Phenolic Cast Resin Unfilled [1] |
|---|---|---|---|---|---|
| Dielectric constant: | | | | | |
| $10^2$ cycles | D150 | 4.62 | 4.77 | 4.93 | 6.5–7.5 |
| $10^3$ cycles | D150 | 4.58 | 4.73 | 4.86 | 5.5–6.0 |
| $10^6$ cycles | D150 | 4.34 | 4.38 | 4.53 | 4.0–5.5 |
| Dissipation factor: | | | | | |
| $10^2$ cycles | D150 | .0134 | .0129 | .0128 | 0.10–0.15 |
| $10^3$ cycles | D150 | .0149 | .0141 | .0151 | 0.01–0.05 |
| $10^6$ cycles | D150 | .0090 | .0114 | .0196 | 0.04–0.05 |
| ARC resistance, sec | D495 | 78±2 | 113±6 | 123±1 | [2] |
| Volume resistivity | D257 | 0.87–1.14×10$^{15}$ | 1.22–1.24×10$^{15}$ | 0.98–1.09×10$^{15}$ | 10$^{12}$–10$^{13}$ |
| Surface resistivity | D257 | 3.35×10$^{16}$ | 8.19×10$^{15}$ | 6.54×10$^{15}$ | |
| Dielectric strength: | | | | | |
| Short time | D149 | 337 | 378 | 320 | 350–400 |
| Step by Step | D149 | 337 | 333 | 378 | 250–300 |
| Water absorption, 24 hr., ⅛ in. thickness, percent | | 0.11 | 0.16 | 0.44 | 0.3–0.4 |

[1] From "Plastics Encyclopedia"—1965.
[2] Negligible.

The above comparative data shows considerable improvement in electrical properties of phenolic resins prepared in accordance with this invention over conventional phenolic resins. This data shows that the electrical properties of phenolic resins are improved throughout a wide range of mol percent modification with the vinyl compound-nitrogen containing material pre-reaction product, i.e. Example 4 (Part B), is 20 mol percent modified, Example 5 is 40 mol percent modified and Example 6 is 80 mol percent modified. Particularly of interest is the im-

Examples 42–51

Referring to Table 4, each of the indicated phenols of Formula 2 is individually reacted with 3,3′-iminodipropionitrile, each in the respective mol quantity specified using the indicated procedure of a designated preceding example. The product phenolic resin in each instance has characteristics generally like those specified for the products of Examples 4 and 8.

TABLE 1.—FORMULA (1) AMINE PREPARATION [1]

| No. | Reactants Amine | Cyanoethylene | Major Product | Yield, percent | Preparation Reference |
|---|---|---|---|---|---|
| A | $NH_3$ | $H_2C=CHCN$ | $NH(CH_2CH_2CN)_2$ | 89 | [2] |
| B | $CH_3CH_2NH_2$ | $H_2C=CHCN$ | $HN\begin{matrix}CH_2CH_2CN\\CH_2CH_3\end{matrix}$ | 90 | [3] |
| C | $HOCH_2CH_2NH_2$ | $H_2C=CHCN$ | $HN\begin{matrix}CH_2CH_2CN\\CH_2CH_2OH\end{matrix}$ | 100 | [4] |
| D | $NH_2CH_2CH_2NH_2$ | $H_2C=CHCN$ | $HN\begin{matrix}CH_2CH_2CN\\CH_2CH_2-NH\\\quad\quad\quad\|\\\quad\quad\quad CH_2CH_2CN\end{matrix}$ | 93 | [5] |
| E | $C_6H_5CH_2NH_2$ | $H_2C=CHCN$ | $HN\begin{matrix}CH_2CH_2CN\\CH_2C_6H_5\end{matrix}$ | 100 | [6] |
| F | $C_6H_5NH_2$ | $H_2C=CHCN$ | $HN\begin{matrix}CH_2CH_2CN\\C_6H_5\end{matrix}$ | 73 | [7] |
| G | $NH_3$ | $H_2C=\overset{CH_3}{\underset{}{C}}CN$ | $H_2N-CH_2\overset{}{\underset{CH_3}{C}}HCN$ | ———— | [8] |

[1] A more exhaustive list of suitable amine products and reference to method of preparation can be found in American Cyanamid Company, The Chemistry of Acrylonitrile, 2d edition, pp. 155–189 (1959).
[2] Wiederman and Montgomery, J. Am. Chem. Soc., 67, 1944 (1945).
[3] Widegrist, Arkiv Kemi, 3, 59–67 (1951).
[4] I.G. Farbenind, A.-G., German Patent 570,677 (1933).
[5] Lincoln, Ellis and Richardson, British Patent 613,807 (1948).
[6] Surrey and Lesher, J. Am. Chem. Soc., 78, 2573 (1956).
[7] Heininger, J. Org. Chem., 22, 1213 (1957).
[8] Dickey American Patent 2,659,739.

TABLE 2.—RESOLE-TYPE PHENOL FORMALDEHYDE REACTION PRODUCTS

| Ex. No. | Amine of Formula 1 [1] Z | $R_1$ | $R_2$ | $R_3$ | ( ) [1] | Phenol (moles) [2] | Preparation Example [2] | Comments |
|---|---|---|---|---|---|---|---|---|
| 10 | $-CH_2CH_2CN$ | H | H | H | (0.8) | Phenol (1.6) | Example 1, Part B | Structure Formula 5 where $Q_1$, $Q_2$ and $Q_3$ are each H, $CH_2OH$ or radical Formula 6 and $Y_1=Y_2=H$. |
| 11 | $-CH_2CH_3$ | H | H | H | (0.8) | do | {Example 1, Part C / Example 2, Part C} | Same as Example 10. |
| 12 | $-CH_2CH_2OH$ | H | H | H | (0.8) | do | Same as Example 11 | Do. |
| 13 | $-CH_2CH_2N\begin{matrix}H\\\|\\NCCH_2-CH_2\end{matrix}$ | H | H | H | (0.8) | do | do | Structure Formula 8 where $Q_4$, $Q_5$, $Q_6$ and $Q_7$ are each H, $CH_2OH$ or radical Formula 9 where $R_4=-CH_2CH_2-$. Also, $Y_1=Y_2=H$. |
| 14 | $-CH_2C_6H_5$ | H | H | H | (0.8) | do | do | Same as Example 10. |
| 15 | $-C_6H_5$ | H | H | H | (0.8) | do | do | Do. |
| 16 | H | H | H | $CH_3$ | (0.8) | do | do | Structure Formula 7 where $Q_4$, $Q_5$, $Q_6$ and $Q_7$ are each H, $CH_2OH$ or radical Formula 6, where Z=H. Also, $Y_1=Y_2=H$. |
| 17 | $-CH_2$-piperidine(NCCH$_2$CH$_2$) | H | H | H | (0.8) | do | do | Same as Example 10. |
| 18 | 2,4-dichlorobenzyl | H | H | H | (0.8) | do | do | Do. |
| 19 | $-(CH_2)_3CH_3$ | H | H | Phenyl | (0.8) | do | do | Do. |
| 20 | $-(CH_2)_3CH_3$ | H | H | $-CH_2OH$ | (0.8) | do | do | Do. |
| 21 | $-(CH_2)_3CH_3$ | H | H | $-CH_2Cl$ | (0.8) | do | do | Do. |
| 22 | $-(CH_2)_3CH_3-CH_2\|NC-CH_2$ | H | H |  | (0.8) | do | do | Do. |
| 23 | $-(CH_2)_3CH_3-CH_2OCH_3$ | H | H |  | (0.8) | do | do | Do. |
| 24 | $-(CH_2)_3CH_3-CH=CH_3$ | H | H |  | (0.8) | do | do | Do. |
| 25 | $-(CH_2)_3CH_3$ | $CH_3$ | H | H | (0.8) | do | do | Do. |

[1] Either the pure amine or the reaction mixture from the Michael preparation of the amine (Table 1) can be used. Value in parentheses represents mole equivalents of reactive amine hydrogen.
[2] A total of 3.2 moles formaldehyde is used with 1.6 moles of phenol in preparing the products. Reaction conditions are given under specific example

TABLE 3.—NOVOLAC-TYPE PHENOL FORMALDEHYDE REACTION PRODUCTS

| Ex. No. | Amine of Formula 1 [1] | | | | Reactants (moles) [2] | Preparation Example [2] | Comments |
|---|---|---|---|---|---|---|---|
| | Z | $R_1$ | $R_2$ | $R_3$ | (Moles) [1] | | |
| 26 | $-CH_2CH_2CN$ | H | H | H | (1.0) {Phenol (5.32) / Formaldehyde (4.7)} | Example 4, Part B | Structure Formula 10 where $Q_8$ is H or radical Type 6 and $Y_1=Y_2=H$. |
| 27 | $-CH_2CH_3$ | H | H | H | (1.0) {Phenol (5.32) / Formaldehyde (4.7)} | Example 4, Part C | Same as Example 26. |
| 28 | $-CH_2CH_2OH$ | H | H | H | (1.0) Same as Ex. 27 | Same as Example 27 | Do. |
| 29 | $-CH_2CH_2\overset{H}{\underset{NCCH_2CH_2}{N}}$ | H | H | H | (1.0) {Phenol (5.32) / Formaldehyde (4.2)} | Example 4, Part D | Structure Formula 12 where $Q_{11}$ and $Q_{12}$ are each H or radical Formula 9 where $R_4=-CH_2CH_2-$. Also, $Y_1=Y_2=H$. |
| 30 | $-CH_2C_6H_5$ | H | H | H | (1.0) Same as Ex. 27 | Same as Example 27 | Same as Example 26. |
| 31 | $C_6H_5$ | H | H | H | (1.0) do | do | Do. |
| 32 | H | H | H | $CH_3$ | (1.0) {Phenol (5.32) / Formaldehyde (4.2)} | Example 4, Part E | Structure Formula 11 where $Q_9$ and $Q_{10}$ are each H or radical Formula 6 where $Z=H$. Also, $Y_1=Y_2=H$. |
| 33 | 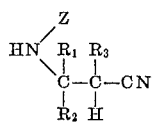 | H | H | H | (1.0) Same as Ex. 27 | Same as Example 27 | Same as Example 26. |
| 34 | 2,4-dichlorobenzyl | H | H | H | (1.0) do | do | Do. |
| 35 | $-(CH_2)_3CH_3$ | H | H | Phenyl | (1.0) do | do | Do. |
| 36 | $-(CH_2)_3CH_3$ | H | H | $-CH_2OH$ | (1.0) do | do | Do. |
| 37 | $-(CH_2)_3CH_3$ | H | H | $-CH_2Cl$ | (1.0) do | do | Do. |
| 38 | $-(CH_2)_3CH_3-CH_2$ with $NC-CH_2$ | H | H | | (1.0) do | do | Do. |
| 39 | $-(CH_2)_3CH_3-CH_2OCH_3$ | H | H | | (1.0) do | do | Do. |
| 40 | $-(CH_2)_3CH_3-CH=CH_2$ | H | H | | (1.0) do | do | Do. |
| 41 | $-(CH_2)_3CH_3$ | $CH_3$ | H | H | (1.0) do | do | Do. |

[1] Either the pure amine or the reaction mixture from the Michael preparation of the amine (Table 1) can be used. Value in parentheses represents mole equivalents of reactive amine hydrogen.
[2] A total of indicated moles of phenol and formaldehyde used in preparing products. Reaction conditions are given under specific example.

TABLE 4.—MIXED RESIN PRODUCTS $A = CH_2N\begin{pmatrix}CH_2CH_2CN\\CH_2CH_2CN\end{pmatrix}$  $B = CH_2OH$  $C = CH_2$

| Ex. No. | Phenol (moles) [1] | Resin type | Preparation [1] | |
|---|---|---|---|---|
| 42 | Meta-cresol (5.32) | Resole | Example 8 | Structure Formula 5, where $Q_1$, $Q_2$ and $Q_3$ are each H, A, or B. Also, $Y_1=H$ and $U_2=CH_3$. |
| 43 | do | Novolac | Example 4, Part F | Structure Formula 10, where $Q_8$ is H or A. Also, $Y_1=H$ and $Y_2=CH_3$. |
| 44 | Para-chlorophenol (1.6) | Resole | Example 8 | Structure Formula 5, where $Q_1$ and $Q_3$ are each H, A, or B and $Q_2=Cl$. Also, $Y_1$ and $Y_2=H$. |
| 45 | Meta-chlorophenol (1.6) | do | do | Same as Example 42 except $Y_1=H$ and $Y_2=Cl$. |
| 46 | Meta-chlorophenol (5.32) | Novolac | Example 4, Part F | Same as Example 43 except $Y_1=H$ and $Y_2=Cl$. |
| 47 | Para-t-butylphenol (1.6) | Resole | Example 8 | Structure Formula 5, where $Q_1$ and $Q_3$ are each H, A, or B and $Q_2=$t-butyl. Also, $Y_1$ and $Y_2=H$. |
| 48 | Para-phenyl phenol (1.6) | do | do | Structure Formula 5, where $Q_1$ and $Q_3$ are each H, A or B and $Q_3=$phenyl. Also, $Y_1$ and $Y_2=H$. |
| 49 | Ortho-phenyl phenol (1.6) | do | do | Structure Formula 5 where $Q_1$ and $Q_2$ are each H, A or B and $Q_3=$phenyl. Also $Y_1$ and $Y_2=H$. |
| 50 | Resorcinol (5.32) | Novolac | Example 4, Part G | Structure Formula 10 where $Q_8$ is H or A. Also, $Y_1=H$ and $Y_2=OH$. |
| 51 | Mixture: Phenol (2.66) / p-Nonylphenol (2.66) | do | Example 4, Part H | Structure Formula 10 where $Q_8$ is H, A and sometimes para-nonyl. Also, $Y_1$ and $Y_2=H$. |

[1] For novolacs, the indicated moles of phenol are used with 4.7 moles of formaldehyde and 129 grams of amine product from Example 1, Part A. For resoles, the indicated moles of phenol are used with 3.2 moles of formaldehyde and 104 grams of amine product from Example 1, Part A. Reaction conditions are given under preparation examples.

What is claimed is:

1. A process for the preparation of curable, modified phenol-formaldehyde resins comprising heating under alkaline liquid phase conditions a reaction mixture comprising formaldehyde, at least one amine of the formula $$HN\begin{matrix}Z\\R_1\;R_3\\|\;\;|\\C-C-CN\\|\;\;|\\R_2\;H\end{matrix}$$

where Z is selected from the group consisting of hydrogen, lower alkyl, aryl, alkaryl, aralkyl, lower haloalkyl, haloaryl, haloalkaryl, haloaralkyl, hydroxy-(lower alkylene), cyano-(lower alkylene), $H_2N$-(lower alkylene), lower alkyl-N-(lower alkylene), di (lower alkyl)-N-(lower alkylene), $H_2N$-(ethylene-NH-ethylene), lower (alkoxy-alkylene), C-substituted 5 and 6 membered heterocyclic rings containing one nitrogen atom and C-substituted 5 and 6 membered heterocyclic rings containing one oxygen atom, $R_1$ is selected from the group consisting of hydrogen, lower alkyl $R_2$ and $R_3$ are each selected from the group consisting of hydrogen, lower alkyl, aryl, cyano (lower alkyl), alkaryl, aralkyl, haloaryl, haloalkaryl, haloaralkyl, hydroxy (lower alkylene), phenyl, lower (alkoxyalkylene), and at least one phenolic material selected from the group consisting of (a) phenol-aldehyde novolac resins, (b) phenol-aldehyde resole resins, and (c) phenols of the formula:

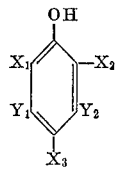

where $X_1$, $X_2$ and $X_3$ are each selected from the group consisting of hydrogen, lower alkyl, aryl, hydroxyl, halo (provided that at least 2 of $X_1$, $X_2$ and $X_3$ are hydrogen in any given molecule), and $Y_1$ and $Y_2$ are each selected from the group consisting of hydrogen, lower alkyl, aryl, hydroxyl, and halo.

2. The process of claim 1 wherein the mol ratio of said formaldehyde to said phenol ranges from about 0.5 to 3.5.

3. The process of claim 1 wherein the mol ratio of said amine to said phenol ranges from about 0.01 to 3.0.

4. The process of claim 1 wherein the reaction is carried out under aqueous liquid phase conditions.

5. The process of claim 1 wherein said amine is prepared by heating a reaction mixture comprising at least one vinyl compound of the formula:

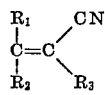

where $R_1$, $R_2$ and $R_3$ are each as defined in claim 1, with at least one nitrogen containing material of the formula:

$$H_2N-Z$$

where Z is as defined in claim 1.

6. The process of claim 5 wherein the mol ratio of said vinyl compound to said nitrogen containing material ranges from about 2.2:1 to 0.8:1.

7. The process of claim 5 wherein said vinyl compound is acrylonitrile and wherein said nitrogen containing material is ammonia.

8. The process of claim 1 wherein said phenol is phenol.

9. A curable modified phenol-formaldehyde resin characterized by having a number average molecular weight of at least about 125 and by containing molecules each of which has a chemical structure containing: (a) at least one cyano group, (b) at least one tri-organo-substituted amine nitrogen atom, and (c) at least one phenyl group, said phenyl group being further characterized by having substituted on the ring thereof: (1) at least one hydroxyl group, (2) at least two di-organo substituted carbon atoms in positions ortho and para of said hydroxyl group, and (3) one of said carbon atoms being bonded to said one amine nitrogen atom said resin having been produced by the process of claim 1.

10. Phenolic resins of the formula:

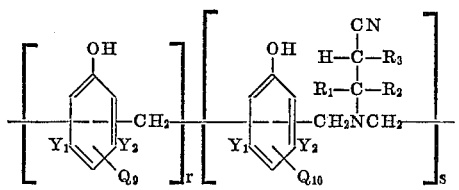

where $Q_9$ and $Q_{10}$ are each selected from the group consisting of hydrogen, —$CH_2$—, and the radical

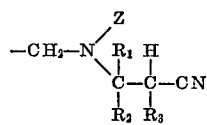

Z is selected from the group consisting of hydrogen, lower alkyl, aryl, alkaryl, aralkyl, lower haloalkyl, haloaryl, haloalkaryl, haloaralkyl, hydroxy-(lower alkylene), cyano-(lower alkylene), $H_2N$-(lower alkylene), lower alkyl-N-(lower alkylene), di (lower alkyl)-N-(lower alkylene), $H_2N$-(ethylene-NH-ethylene), lower (alkoxyalkylene), C-substituted 5 and 6 membered heterocyclic rings containing one nitrogen atom and C-substituted 5 and 6 membered heterocyclic rings containing one oxygen atom, $R_1$ is selected from the group consisting of hydrogen, lower alkyl, $R_2$ and $R_3$ are each selected from the group consisting of hydrogen, lower alkyl, aryl, cyano (lower alkylene), alkaryl, aralkyl, haloaryl, haloalkaryl, haloaralkyl, hydroxy (lower alkylene), phenyl, lower (alkoxyalkylene), $Y_1$ and $Y_2$ are each selected from the group consisting of hydrogen, lower alkyl, aryl, hydroxyl, and halo, and $r$ and $s$ are each a number greater than 0, and the sum of $r$ and $s$ is always (on a number average basis) at least two.

11. Novolac resins of the formula

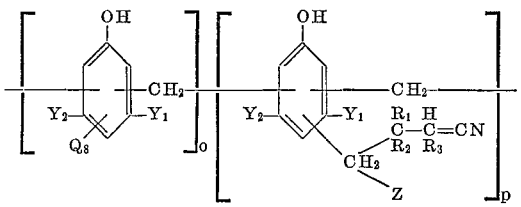

where $Q_8$ is selected from the group consisting of hydrogen, —$CH_2$— and the radical

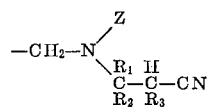

Z is selected from the group consisting of hydrogen, lower alkyl, aryl, alkaryl, aralkyl, lower haloalkyl, haloaryl, haloalkaryl, haloaralkyl, hydroxy-(lower alkylene), cyano-(lower alkylene), $H_2N$-(lower alkylene), lower alkyl-N-(lower alkylene), di(lower alkyl)-N-(lower alkylene), $H_2N$-(ethylene-NH-ethylene), lower (alkoxyalkylene), C-substituted 5 and 6 membered heterocyclic rings containing one nitrogen atom and C-substituted 5 and 6 membered heterocyclic rings containing one oxygen atom, $R_1$ is selected from the group consisting of hydrogen, lower alkyl, $R_2$ and $R_3$ are each selected from the group consisting of hydrogen, lower alkyl, aryl, cyano (lower alkylene), alkaryl, aralkyl, haloaryl, haloalkaryl, haloaralkyl, hydroxy (lower alkylene), phenyl, lower (alkoxyalkylene), $Y_1$ and $Y_2$ are each selected from the group consisting of hydrogen, lower alkyl, aryl, hydroxyl, and halo, and $o$ and $p$ are each a number greater than 0, and the sum of $o$ and $p$ is always (on a number average basis) at least 2, and typically is less than about 20.

12. Phenolic resins of the formula:

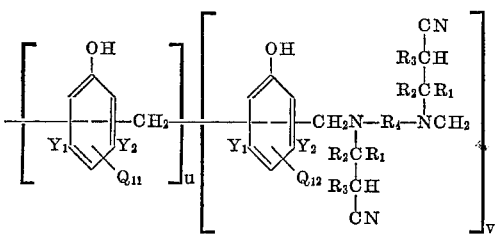

wherein $Q_{11}$ and $Q_{12}$ are each selected from the group consisting of hydrogen and the radical

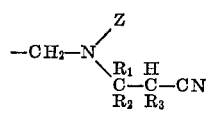

Z is selected from the group consisting of hydrogen, lower alkyl, aryl, alkaryl, aralkyl, lower haloalkyl, haloaryl, haloalkaryl, haloaralkyl, hydroxy-(lower alkylene), cyano-(lower alkylene), $H_2N$-(lower alkylene), lower alkyl-N-(lower alkylene), di (lower alkyl)-N-(lower alkylene), $H_2N$-(ethylene-NH-ethylene), lower(alkoxyalkylene), C-substituted 5 and 6 membered heterocyclic rings containing one nitrogen atom and C-substituted 5 and 6 membered heterocyclic rings containing one oxygen atom, $R_1$ is selected from the group consisting of hydrogen, lower alkyl, $R_2$ and $R_3$ are each selected from the group consisting of hydrogen, lower alkyl, aryl, cyano (lower alkylene), alkaryl, aralkyl, haloaryl, haloalkaryl, haloaralkyl, hydroxy (lower alkylene), phenyl, lower (alkoxyalkylene), $Y_1$ and $Y_2$ are each selected from the group consisting of hydrogen, lower alkyl, aryl, hydroxyl, and halo, and $u$ and $v$ are each a number greater than 0, and the sum of $u$ and $v$ is always (on a number average basis) at least 2, and typically, is less than about 20.

References Cited

UNITED STATES PATENTS

| | | | |
|---|---|---|---|
| 2,228,271 | 1/1941 | Jacobson et al. | 260—72 |
| 2,710,851 | 6/1955 | Boyd | 260—72 |

OTHER REFERENCES

Journal of Medicinal Chemistry, vol. 7 (1964), Burke et al., pp. 670–671.

Chemistry of Phenolic Resins, Martin (1956), pp. 87–88 and 96.

WILLIAM H. SHORT, *Primary Examiner.*

H. SCHAIN, *Assistant Examiner.*

U.S. Cl. X.R.

117—145, 155, 161; 161—211, 259; 252—64; 260—32.8, 33.4, 59, 465, 839